United States Patent [19]

Dillingham

[11] 3,903,507

[45] Sept. 2, 1975

[54] TERMINAL SELECTOR INTERFACE BETWEEN CENTRAL PROCESSOR AND A PLURALITY OF TERMINALS

[75] Inventor: Edward Dillingham, Pacific Palisades, Calif.

[73] Assignee: Data Source Corporation, El Segundo, Calif.

[22] Filed: Jan. 3, 1974

[21] Appl. No.: 430,423

[52] U.S. Cl. .............. 340/163; 340/147 P; 340/151

[51] Int. Cl.² .......................................... H04Q 11/00

[58] Field of Search .... 340/151, 163, 147 P, 152 R; 179/2 DP

[56] References Cited

UNITED STATES PATENTS

| | | | |
|---|---|---|---|
| 3,323,107 | 5/1967 | Du Vall | 340/163 X |
| 3,484,694 | 12/1969 | Brothman | 340/151 X |

*Primary Examiner*—Harold I. Pitts

*Attorney, Agent, or Firm*—Seidel, Gonda & Goldhammer

[57] ABSTRACT

A terminal selector interface between a central processor and a plurality of terminals wherein information from a central processor is sent to all terminals simultaneously and the central processor "listens" to terminals individually. As each terminal is being addressed, the preceding addressed terminal is connected by means of a multiplexor switching means to the central processor. If the preceding terminal has information to transmit, it raises its carrier which aborts the partially sent succeeding address. The terminal selectors of the present invention may be connected in cascade to provide for additional terminals or to provide flexibility in system design.

24 Claims, 7 Drawing Figures

TERMINAL SELECTOR INTERFACE BETWEEN CENTRAL PROCESSOR AND A PLURALITY OF TERMINALS

BACKGROUND OF THE INVENTION

The present invention relates to a terminal selector interface between a central processor and a plurality of terminals. More particularly, the present invention relates to a terminal selector in which information from the central processor is sent to all of the terminals simultaneously and the central processor receives from the terminals individually.

In the past, for example as shown in U.S. Pat. No. 3,795,895 entitled "Polling Interrupt for Data Information System", the central processor transmitted to all of the terminals simultaneously and "listened to" all of the terminals to ascertain whether any terminal raised its transmit carrier. If any terminal having information to transmit raised its carrier in response to recognizing its address, the central processor aborted all further addresses. The central processor then received information from the terminal that had raised its carrier.

However, this resulted in high noise levels being received by the central processor. Each terminal or any electronic equipment generates a certain amount of electronic noise. In addition, the lines connecting terminals to a central processor pickup electronic noise from the environment. A major source of such noise is due to coupling of the signal being transmitted to the terminals into the lines carrying signals back to the central processor. In a two-wire system, this transmitted signal is fully coupled into the lines back to the central processor, and when many terminals are connected with two wire lines, this noise builds up beyond the capability of the processor's receiver to discriminate against it.

Furthermore, when the central processor listens to all terminals simultaneously, if any one terminal is faulty and erroneously raises its carrier, or if a line is faulty and simulates a terminal raising its carrier, then no other terminals can be serviced.

The prior art also required that the telephone company provide a bridging service to the users of the data system. The telephone company had to provide a means wherein all of the terminals were in effect connected in parallel. The present invention eliminates the requirement of these bridging services and therefore eliminates the cost of this bridging service. Bridging services provided by the telephone company are relatively expensive. The present invention enables users to take advantage of point to point telephone rates for data transmission where these are more attractive economically.

SUMMARY OF THE INVENTION

In accordance with the present invention, apparatus for controlling communication between a central processor and a plurality of terminals is provided. This apparatus includes means for receiving terminal address information in the form of a series of terminal addresses from the central processor. Means is provided for sending the terminal address information to the plurality of terminals simultaneously. Additionally, the apparatus includes means for aborting information received from the central processor in response to a terminal raising its carrier. The apparatus includes means responsive to the terminal address information for enabling the central processor to receive information sent only from the last previously addressed terminal. Further, means are provided for limiting or timing out the message sent by a terminal so that after a predetermined time the apparatus stops listening to the transmitting terminal and allows the addressing of other terminals to continue.

An advantage of the present invention is that it reduces the electrical noise level received at the central processor.

Another advantage of the present invention is that low cost two wire telephone lines can be used to connect large numbers of terminals to a central processor.

Another advantage of the present invention is that it provides a more economical means of interfacing a large number of remote terminals to a central processor.

Another advantage of the present invention is that it provides a means of rapidly addressing a large number of distantly located terminals.

Another advantage of the present invention is that a faulty terminal or line will not prevent servicing of the other terminals.

A further advantage of the present invention is that the terminal selectors may be cascaded to provide flexibility of data system organization.

A still further advantage of the present invention is that is may be used with unique terminal addresses or may be used with a system in which the addresses are words which are also used for other purposes.

A still further advantage of the present invention is that the distortion level of the data signal is substantially reduced.

Another advantage of the present invention is that two wire and four wire telephone lines can be mixed.

A further advantage of the present invention is that multi-drop and point to point lines can be mixed.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DESCRIPTION OF THE PREFERRED EMBODIMENTS

Figure 1:
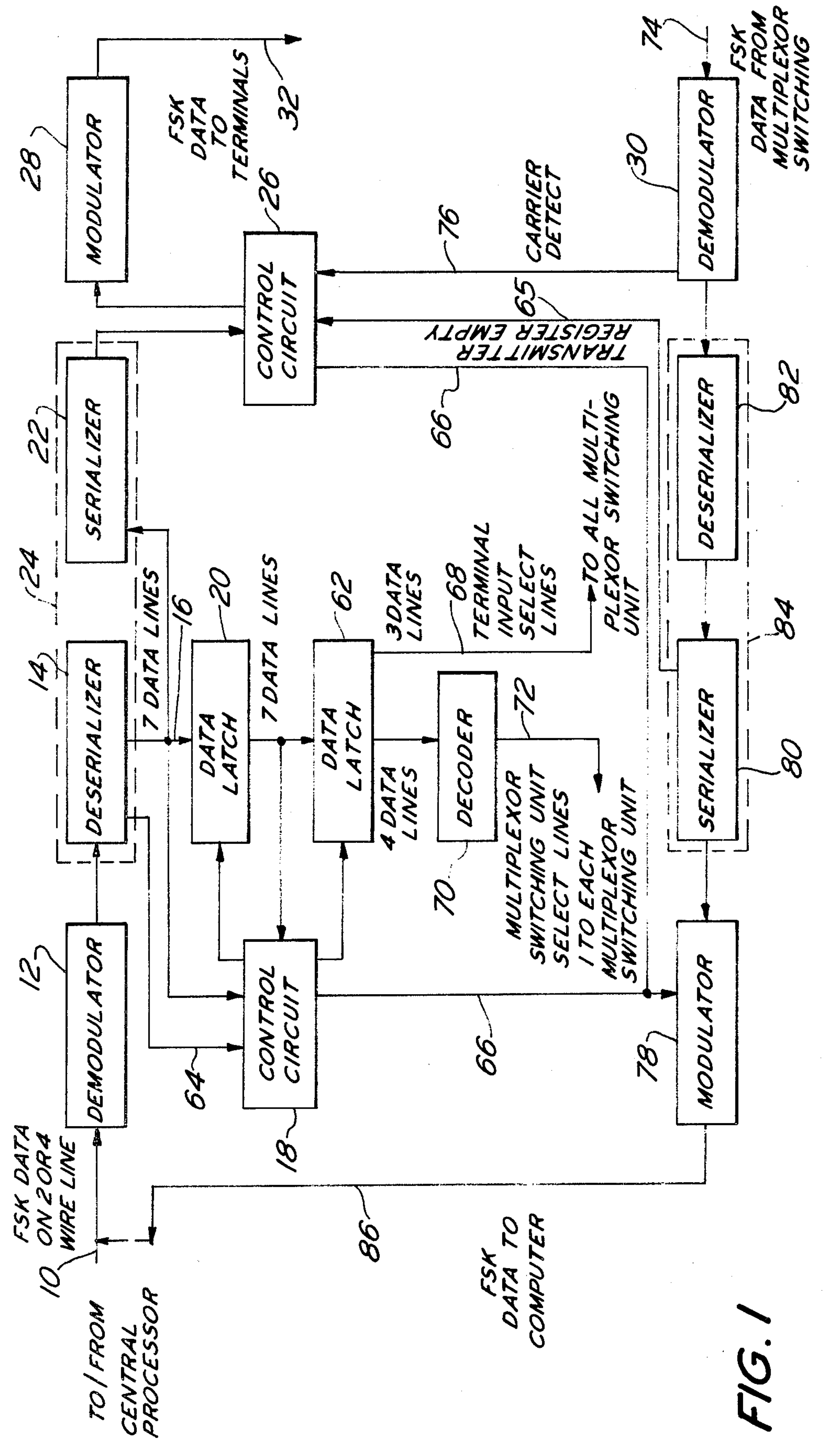
FIGS. 1 and 2, taken together, are schematic diagrams in block diagram form of an apparatus in accordance with the present invention.

Referring now to the drawings in detail wherein like numerals indicate like elements, there is shown a demodulator 12 for receiving a modulated data signal over line 10. Line 10 may be either a 2 or 4 wire line system. Either 2 or 4 wire line systems are commonly used by telephone companies. The exact manner in which a demodulator may be connected to either a 2 or 4 wire line will be described hereinafter.

The modulated data signal fed to demodulator 12 may be any suitable signal having digital data modulated therein. However, a specific example of such a modulated signal is a frequency shift keying signal which is commonly used in the transmission of digital data over telephone lines. The remainder of the description herein will be described in terms of a frequency shift keying (FSK) parallel8c but it will be understood that the present invention is not limited to this particular type of a modulated signal. Other suitable forms of modulation may be used.

The output of demodulator 12 is fed to deserializer 14. Deserializer 14 converts the digital data from serial form into parallel form. The digital data in parallel form is fed via seven parallel lines labeled 16 to control circuit 18, data latch circuit 20 and serializer 22. Serializer 22 converts the data in parallel form back to serial form. Deserializer 14 and serializer 22 may be purchased commercially as a universal asynchronous receiver/transmitter unit and is shown as circuitry 24 in the dotted lines.

The output of serializer 22 is fed to another control circuit 26. Control circuit 26 either passes the output of serializer 22 unchanged to modulator 28 or causes a steady "mark" or digital one condition to be fed to modulator 28. Basically, control circuit 26 causes the succeeding address codes to be aborted by placing a constant mark condition on the line in response to the detection by demodulator 30 of a carrier being placed on the line by a terminal which recognized its address and had information to transmit to the central processor. This will be discussed in greater detail hercinafter. The output of modulator 28 is fed via line 32, on FIGS. 1 and 2 to all of the lines 34 going to terminals via amplifiers 35.

Figure 2:
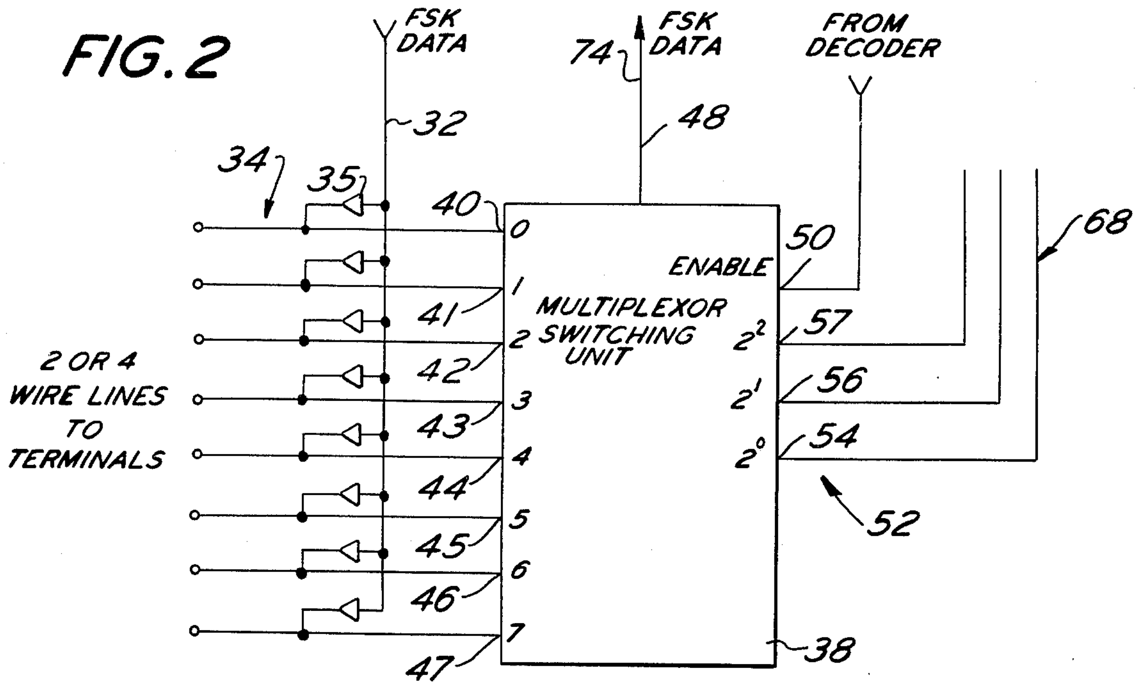

In FIG. 2, a multiplexor switching unit 38 is shown. When the multiplexor 38 is enabled by line 50 from the decoder 70 and a particular one of lines 34 is selected according to address lines 52, the incoming signal from the selected terminal is connected to the multiplexor output 48 and through line 74 to the demodulator 30. In the case of two wire connections, the signal being transmitted to the selected terminal by one of the amplifiers 35 is fed back to demodulator 30. All of the other lines 34 are isolated from the demodulator 30 by means, such as for example, field effect transistor switches 60 (FIG. 5) in the multiplexor switching unit 38.

FIG. 2 shows lines 34 connecting to only eight terminals. However, it is understood that line 32 would be connected to all of the lines going to all of the terminals. FIG. 2 shows the multiplexor switching unit 38 having eight terminal inputs 40–47. It is understood that multiplexor switching unit or multiplexor switching means 38 may have more or less terminal inputs as desired. In one specific embodiment of the present invention, by way of example and not limitation, applicant has used eight multiplexor switching units or multiplexor switching means 38 each having eight terminal inputs. However, it is apparent that other numbers of multiplexor switching units could be used with each multiplexor switching unit having different numbers of terminal inputs. For example, multiplexor switching units having eight or 16 terminal inputs are well-known and commercially available.

Multiplexor switching unit 38 is basically a circuit means which connects one of the terminal inputs 40–47 to output 48 in response to an enable signal or enable input 50 and signals on code input 52 which, as shown in the specific embodiment in FIG. 2, is comprised of code bit inputs 54, 56 and 57.

Figure 5:
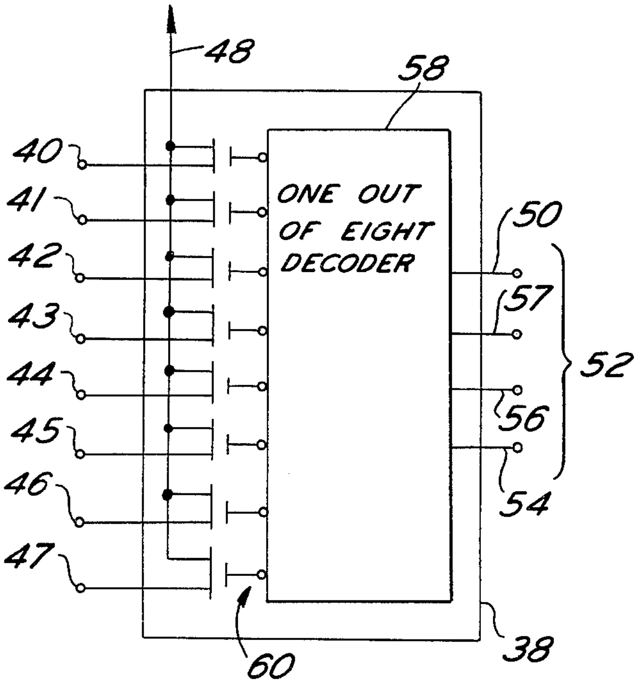
FIG. 5 is a detailed schematic diagram, partially in block diagram form, of a multiplexor switching unit in accordance with the present invention.

A specific embodiment of a multiplexor switching unit is shown in FIG. 5. The inputs and the output 48 are numbered the same as in FIG. 2. It is seen in FIG. 5 that the code input 52 and enable input 50 are fed to a one out of eight logic decoder circuit 58 which enables one of the field effect transistors 60 thereby connecting one of the terminal input 40–47 to the output 48. However, it is understood that any other suitable controlled switching circuit may be used as multiplexor switching unit 38.

Referring back to FIG. 1, the generation of the enable signal and the code signal for the multiplexor switching unit 38 will be discussed. When deserializer 14 has received a complete character from the central processor, it signals the control circuit 18 via line 64 that it has a character ready. At this time, control circuit 18 decides whether the character now stored in data latch 20 is a terminal address which should be used to select a terminal via decoder 70 and multiplexor 38, or whether the previously selected terminal should remain selected. This decision depends on the contents of the character in data latch 20 and on the signal received on line 66 from control circuit 26, or it may depend on the recognition of some previous control character, all of which are described more fully hereinafter. If the decision is that the character in data latch 20 should be used to select a terminal, this character is transferred to data latch 62, otherwise the character previously stored in data latch 62 is retained there. In either case, the character in deserializer 14 is now transferred in parallel to data latch 20 and serializer 22.

Part of the data stored in data latch circuit 62 is fed via lines 68 to code input 52 of multiplexor switching unit 38. The remainder of the digital signal shifted out of data latch circuit 62 is fed to decoder circuit 70. The output of decoder circuit 70 appears on one of a plurality of lines. One of the lines 72 is connected to the enable input of a multiplexor switching unit. Decoder 70 decodes the data input and selects which one of the multiplexor switching units 38 will be enabled by an enable signal on lines 72. As shown in FIG. 2, this enable signal is applied to enable input 50 on multiplexor switching unit 38. The terminal or terminal input which is connected to output 48 of multiplexor swtiching unit 38 in response to inputs on enable input 50 and code input 52 is the terminal that has just been addressed.

The process described above is repeated for each character received until some terminal responds to its address by turning on its carier. As described hereinafter, this action results in control circuit 26, among other things, generating a disable signal on line 66 which causes control circuit 18 to inhibit subsequent transfer of new data latch 20 to data latch 62. In this case, the address previously stored in data latch 62 is not changed, and the selected terminal which has responded remains connected via multiplexor 38 to demodulator 30.

The output 48 of multiplexor switching unit 38, which is connected to one of the terminals via one of the lines 34 and one of the field effect transistor switches 60, as shown in FIG. 5, is fed via line 74 to demodulator 30 on FIG. 1.

Demodulator 30 demodulates the frequency shift keying signal on line 74 and also detects the carrier of the terminal as soon as it appears on line 74. Demodulator 30 generates a carrier detect signal on line 76 which is fed to control circuit 26.

In accordance with the present invention, one of the last bits of every terminal address is a space or zero bit. Preferably, the last data bit in each address would be a space or zero bit. In a common serial data transmission code (ASCII, American Standard Code for Information Interchange), the last data bit is the eighth of 10 bits, being followed by a parity bit and a stop bit, which by convention is a mark.

As is well-known in this technology, a mark bit is the equivalent of a digital one or a predetermined voltage level or a predetermined amount of current. A space bit is usually by convention a digital zero bit or a zero voltage level or zero current level. However, in practicing this invention, any other suitable convention may be used as long as there are two distinct levels which denote two separate conditions. In other words, the conventions described herein may be reversed in carrying out the present invention. This is well understood in this technology. However, the invention will be described herein in the context of conventional marks and spaces wherein a mark condition is used as a stop bit and a space condition is used as a start bit for the sake of concreteness in demonstrating a specific example of the present invention.

As indicated above, the last bit position prior to the parity bit of each terminal address is a space. In response to demodulator 30, detecting a carrier placed on the line by an addressed terminal having information to transmit back to the central processor, control circuit 26 places a steady mark condition on the output going to modulator 28 thereby aborting all further valid address codes until carrier is no longer detected and a transmitter register empty signal is provided on line 65 from serializer 80. Control circuit 26 also provides a time out or message limiting function described more fully hereinafter with reference to FIG. 3. Control circuit 26 also supplies a signal via line 66 to enable modulator 78 and to cause control circuit 18 to disable or inhibit transfer of data into latch 62 during the same period. The signal applied on line 66 to enable modulator 78 raises carrier to allow transmission from a terminal to the central processor. The transmitter register empty signal from serializer 18 indicates that all of the information previously in serializer 80 has been transmitted back to the central processor.

The demodulated output of demodulator 30 is fed to deserializer 82. Deserializer 82 converts the data to parallel form and sends it to serializer 80 which converts it back into serial form. Serializer 80 and deserializer 82 may be a circuit unit 84 similar to that of circuitry 24. This circuit unit 84 completely reconstitutes the signal reducing distortion to an absolute minimum. Circuitry 24 and circuit unit 84 may take digital signals having a distortion of in excess of 40% and retransmit them with a distortion of less than 1%.

The output of serializer 80 is fed to modulator 78 which modulates the carrier in response to the digital signal to form a frequency shift keying signal which is sent to the central processor via line 86. Alternately, if telephone line distortion is expected to be small, deserializer 82 and serializer 80, and modulator 78 may be omitted, and FSK data 74 from the multiplexor may simply be amplified and retrasmitted to the central processor.

Figure 3:
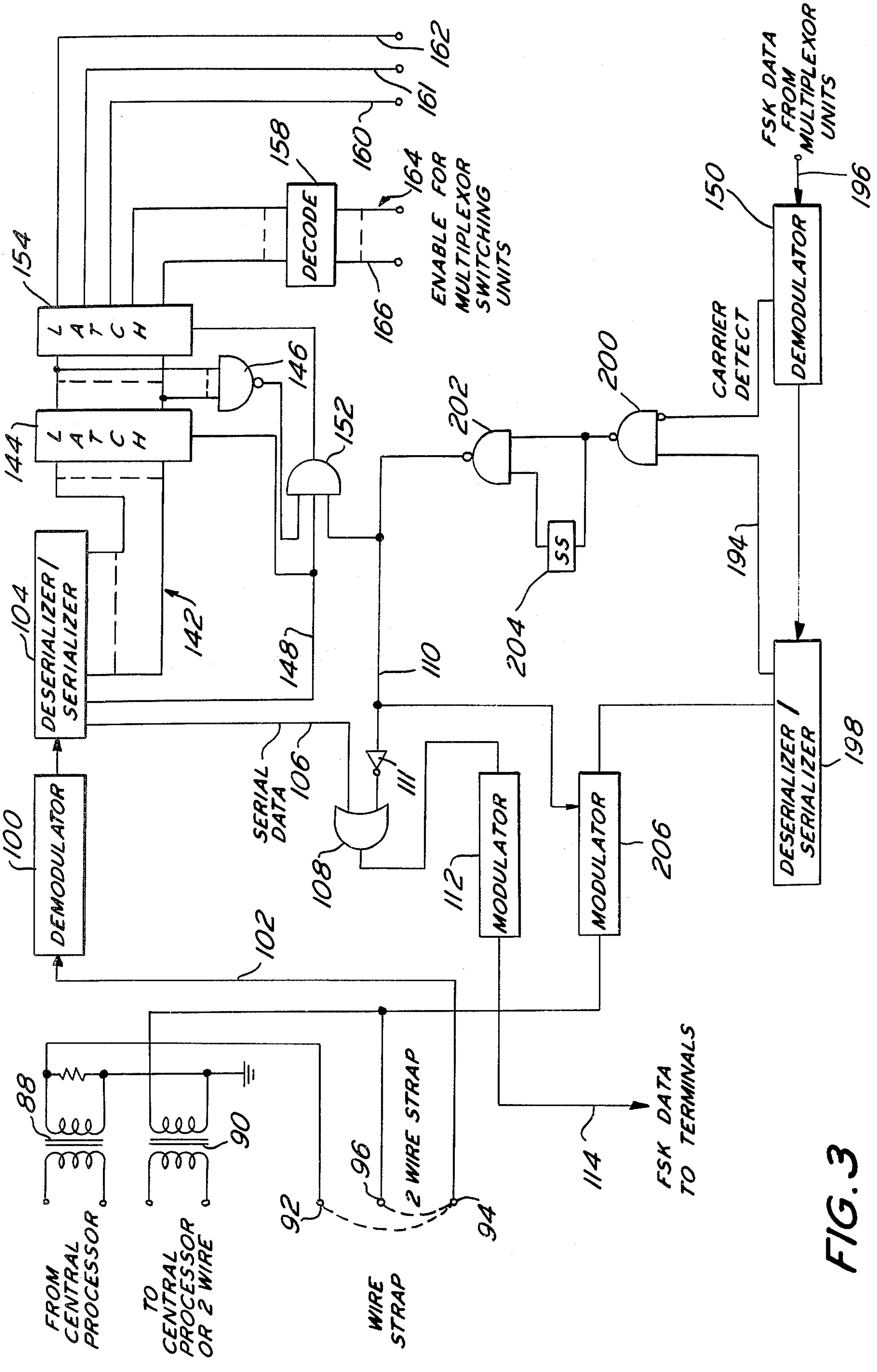
FIGS. 3 and 4 are detailed schematic diagrams, partially in block diagram form, of a preferred embodiment of the present invention.
Figure 4:
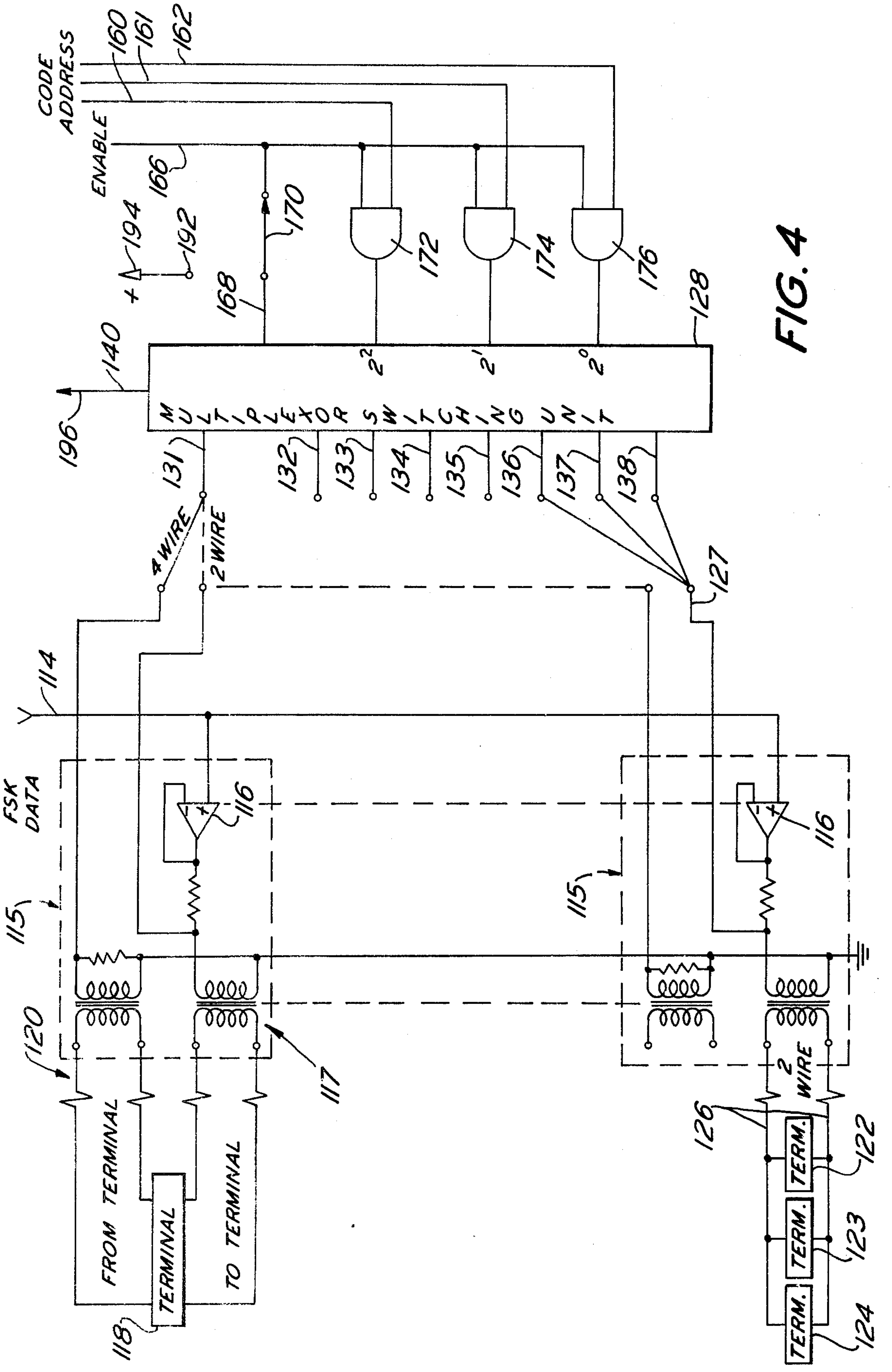

Referring to FIGS. 3 and 4, there is shown a preferred embodiment of the invention in great detail. The terminal selector may be connected either to a two-wire or a four-wire line system. In the case of a four-wire system, two wires from the central processor are connected to the terminals of transformer 88 and two wires are connected to terminals of transformer 90 which carry information back to the central processor. In the case of a four-wire system, transformer 88 is connected to demodulator 100 by means of a conductive strap between terminals 92 and 94.

In the case of a two-wire system in which the same two wires are used in sending information to the central processor and receiving information from the central processor, the two wires are connected only to the terminals of transformer 90. In the case of a two-wire system transformer 90 is connected to demodulator 100 via a conductive strap between terminals 96 and 94.

In either case, data received from the central processor appears at terminal 94 and is applied to demodulator 100 via line 102. The output of demodulator 100 is fed to deserializer/serializer 104 which may be a circuit as described with respect to circuitry 24 and is commercially available. Serial data out of deserializer/serializer 104 is fed via line 106 to OR gate 108. If a terminal has not raised its carrier, line 110 will have a high level or "1" signal, as described hereinafter, which is inverted to "0" through inverter 111, thereby allowing the data on line 106 to be passed through OR gate 108 and applied to the input of modulator 112. The output of modulator 112 is fed via line 114 to the terminals through a plurality of line isolation circuits 115. The line isolation circuits 115 each include an amplifier 116 and a transformer 117, as shown in FIG. 4. The terminals may be connected to the terminal selector by either two or four-wire lines. For example, terminal 118 is shown in FIG. 4 connected to the terminal selector via a four-wire line system 120. The break in the line indicates that the lines may be long telephone lines. Terminals 122, 123 and 124 are shown connected to a single two-wire system. In other words, each of the terminals 122, 123 and 124 transmit and receive information over the same two wires shown at 126. Normally, only a single terminal will be connected to a two-wire or four-wire line system. However, terminals 122, 123 and 124 indicate that multiple terminals may be connected across the same line system. In such a case, line 127 would be connected to terminal inputs 136–138. In other words, when the address of terminal 122 has been sent via line 114, line 127 is connected to output 140 of multiplexor switching unit 128 via terminal input 136. Similarly, terminal 123, when it has been addressed, is connected to output 140 via terminal input 137 and terminal 124 is connected via terminal input 138 immediately after terminal 124 has been addressed.

Referring back to FIG. 3, parallel output of deserializer/serializer 104 is fed via lines 142 to data latch circuit 144. In a preferred embodiment, lines 142 are comprised of seven lines, corresponding to a seven bit data word.

The data latch circuit 144 outputs are connected via lines 145 to the data latch circuit 154 inputs and to the NAND gate 146 inputs. The NAND gate 146 output is low when the ASCII character DEL has been received and is stored in data latch circuit 144. The output of NAND gate 146 is high when the DEL character is not detected. Deserializer/serializer 104 provides a high output on line 148 which indicates that a full character has been received and is present on lines 142. Line 110 has a 1 or high level when no carrier has been detected by demodulator 150. When all these conditions are present, the output of AND gate 152 goes high. This output signal from AND gate 152 causes the data present on the outputs of data latch circuit 144 to be loaded into data latch circuit 154. At the same time, the signal on line 148 indicating that a full character has been received causes the data present on the outputs of deserializer/serializer 104 to be loaded into data latch 144 and into the serializer portion of 104. Suitable delay circuitry may be provided to ensure that data latch 154 is loaded before the data in data latch 144 changes.

Thus, data latch 144 always contains the character which has most recently been received from the central processor and is about to be transmitted to the terminals, while data latch 154 normally contains the last or most previous character that has been transmitted to the terminals. However, if a terminal has responded to its address being transmitted, line 110 will have an 0 level, thus disabling AND gate 152 to prevent further transfer of data into data latch 154 so that the address of the terminal that has responded remains in data latch 154. Also, if the most recent character received from the central processor is ASCII "Delete", NAND gate 146 similarly inhibits the transfer so the previous character received remains in data latch 154.

The output of data latch circuit 154 is applied to decode circuit 158 and lines 160, 161 and 162 shown on FIGS. 3 and 4. As shown in FIGS. 3 and 4, in a preferred embodiment, four of the output lines of data latch circuit 154 would be fed to decode circuit 158 and the remaining three would be address information which is fed through gating to multiplexor switching unit 128 via lines 160-162. Of course, this seven line system based upon a 7 bit data word is only a specific embodiment of the present invention, and if desired, more or less data bits per word may be used and this would result in more or less lines. Furthermore, depending upon the exact structural arrangement, such as whether eight or 16 input multiplexor switching units are used, the decode circuit 158 may receive 4 or 3 bits. In other words, if the multiplexor switching unit 128 utilized 16 terminal inputs, four address bits of information would be required for proper operation of the multiplexor switching units.

The output of decode circuit 158 is an enable signal on one of the lines 164. The enable signal on one of the lines 164 is applied to an enable line 166 as shown in FIG. 4. For the sake of concreteness, assume that the line labeled 166 on the output of decode circuit 158 is connected to line 166 in FIG. 4. In other words, lines 164 include line 166 and others. In the specific example described herein, each terminal selector could be provided with eight multiplexor switching units, each of which is provided with eight terminal inputs. Therefore, decode circuit 158 selects one of the eight multiplexor switching units 128.

The enable signal on line 166 is applied to enable input 168 via mode switch 170 and as one input to AND gates 172, 174 and 176. With mode switch 170 as shown in FIG. 4, and enable signal on line 166 enables multiplexor switching unit 128 and also gates the address information present at lines 160, 161 and 162 into the multiplexor switching unit 128 via and gates 172, 174 and 176. Thus the enable signal and the code or address signal present on lines 160, 161 and 162 cause multiplexor switching unit 128 to connect a particular one of terminal inputs 131–138 to output 140.

Figure 6:
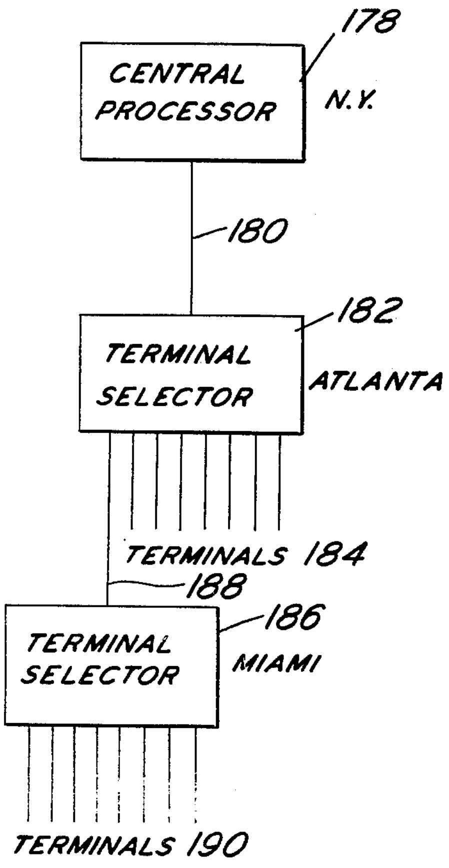
FIG. 6 is a schematic diagram illustrating terminal selectors connected in cascade in accordance with the present invention.

The terminal selector as shown in FIGS. 3 and 4 may also be used in a form wherein terminal selectors are cascaded in order to provide a greater flexibility in setting up data information systems and to make more economical use of long distance telephone lines. Referring to FIG. 6, there is shown a possible data information system in which a central processor 178 is located in New York. A telephone line 180 connects the central processor 178 with a terminal selector 182 located in Atlanta, Ga. Terminal selector 182 functions in conjunction with a plurality of terminals 184 and is also connected in cascade with terminal selector 186 which may be located in Miami, Fla. via telephone line 188. Terminal selector 186 operates in conjunction with a plurality of terminals 190. The advantages and flexibility of this system are readily apparent. First of all, more efficient use may be made of telephone line 180 running between New York and Atlanta by servicing a large number of terminals over a single telephone line. Furthermore, this enables a terminal selector to be located in Miami, Fla. without having to run a line from Florida to New York. The additional terminals may be added in Miami by merely having a line between Atlanta and Miami which is much cheaper than a line between Miami and New York. This cascading feature of the present invention is very important in locations where there are not a sufficient number of terminals at the particular location to use the total capability of the terminal selector. In this manner, a terminal selector may be located at that location and will be used to receive data from other terminal selectors located elsewhere.

Referring to FIG. 4, mode switch 170 in conjunction with AND gates 172, 174 and 176 provide the cascade mode of operation. The cascade mode of operation is achieved by switching switch 170 so that the arm of switch 170 is in contact with terminal 192 which is connected to a positive supply of voltage 184. This causes multiplexor switching unit 128 to be constantly enabled. When the outputs of AND gates 172, 174 and 176 are disabled and have zero outputs, the multiplexor switching unit 128 provides a connection between terminal input 131 and output 140. Since AND gates 172, 174 and 176 are disabled and have zero outputs, except when multiplexor switching unit 128 is selected by an enable signal on line 166, the connection between terminal input 131 and output 140 will be maintained except when some other terminal input 132–138 of multiplexor switching unit 128 is selected by the output of data latch circuit 154. Therefore, a second terminal selector may be connected in cascade through input 131.

In either normal operation or cascade mode of operation, the signal on output 140 is a frequency shift keying signal, when carrier is present which is applied to demodulator 150 via line 196. Demodulator 150 demodulates the frequency shift keying signals and provides the resulting digital data signal to deserializer/-serializer 198. Demodulator 150 also provides a carrier detect signal to one terminal of NAND gate 200. The carrier detect signal is inverted at the input of NAND gate 200. Deserializer/serializer 198 also provides a signal on line 194 which indicates that the transmitter register of deserializer/serializer 198 is empty. The output of NAND gate 200 is low only when carrier is not detected and the transmitter register of the deserializer/-serializer 198 is empty. The output of NAND gate 200 is applied to NAND gate 202 and to single shot 204. Single shot 204 provides an output pulse of a predetermined time duration normally chosen to slightly exceed the time of transmission of a terminal message, for example, about 5 seconds, so that the output of NAND gate 202 will go low only for the duration of time that the output of NAND gate 200 is high or until the end of the 5 second interval. In other words, once the carrier is detected by demodulator 150, the output of NAND gate 202 will go low, until the transmitter register of deserializer/serializer 198 is empty and carrier is no longer detected or for five seconds, whichever is shorter. The output of NAND gate 202 is applied via line 110 to one of the inputs of AND gate 152, as discussed above, to OR gate 108, which is the abort gate, and to modulator 206. When the signal on line 110 is high, the signal is inverted by inverter 111 and data on line 106 is modulated and put onto line 114. Also, when line 110 is high, modulator 206 is disabled or squelched. When the signal on line 110 is low, the signal is inverter by inverter 111 and the output from 108 is a constant 1 making line 114 a constant mark. Also, when the signal on 110 is low, modulator 206 is enabled.

Figure 7:
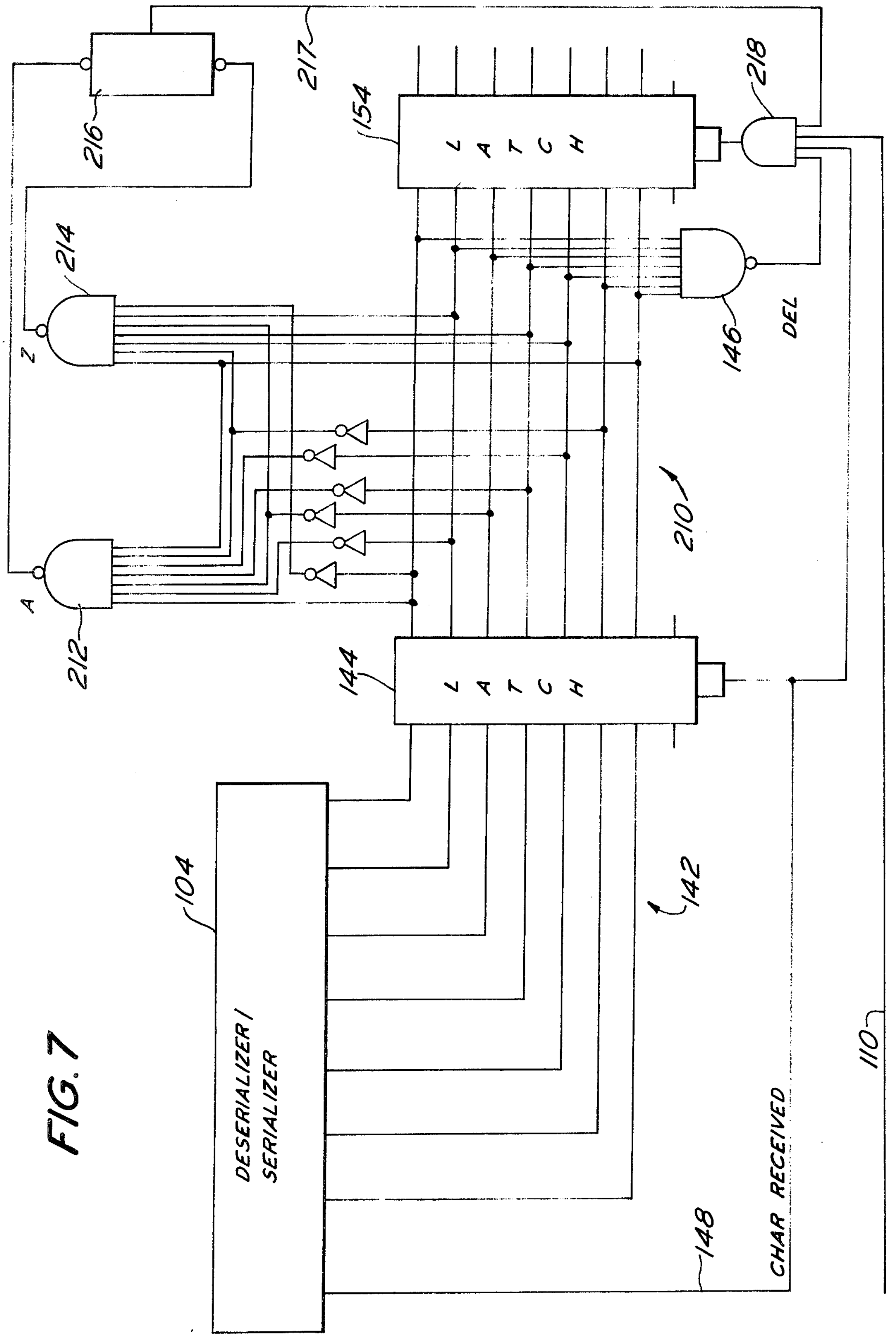
FIG. 7 is a detailed schematic diagram, partially in block diagram form, of a modification of the present invention forming another embodiment of the present invention.

Referring now to FIG. 7, there is shown another embodiment of the invention which is a modification of the circuitry shown in FIG. 3. The invention as shown in FIG. 7 may be used where the data words used as terminal addresses are also used for other purposes in communicating between the central processor and the terminals and vice versa. Basically, the embodiment shown in FIG. 7 is a detailed amplification of one embodiment of control circuitry 18 which detects a first predetermined control character which indicates that the following data words are terminal addresses and a second predetermined control character to indicate the end of the transmission of terminal addresses.

Elements which are identical in FIGS. 3 and 7 are numbered the same.

The parallel output of deserializer/serializer 104 appear on lines 142. The character received signal appears on line 148 from deserializer/serializer 104. As described above, line 110 has a high signal when no terminal is transmitting back to the central processor. Data latch circuits 144 and 154 receive the parallel output of deserializer/serializer 104 in sequence similar to that shown in FIG. 3. AND gate 146 which detects the ASCII character DEL receives its inputs from the lines 210 connecting the output of data latch circuit 144 and input of data latch circuit 154. The signals on lines 210 are also fed to NAND gates 212 and 214. The signals on predetermined lines of the group of lines 210 are inverted so that NAND gate 212 will detect the first predetermined control character and NAND gate 214 will detect the second predetermined control character. The particular example illustrated in FIG. 7 illustrates NAND gate 212 detecting the ASCII character A. NAND gate 214 is shown connected to detect the ASCII character Z. However, these characters are selected arbitrarily to illustrate a concrete embodiment of the invention. Any other characters or code could be used as the control characters.

Assume that initially flip flop 216 is reset, so that its output provides a low or false input to AND gate 218. When deserializer/serializer 104 has received a full character from the central processor, it puts a high or true signal on line 148 which causes the parallel output data on lines 142 to be loaded into data latch 144. The low input to gate 218 causes its output to be low, inhibiting loading of data latch 154, which therefore retains its previously stored character. The new character now stored in data latch 144 is decoded by NAND gates 146, 212 and 214. If the new character is anything other than ASCII "A" (or whatever character is to be recognized by gate 212), flip flop 216 will remain reset, and the previous conditions will remain. If the new character is ACII A, then NAND gate 212 will recognize it and provide a low output to the set input of flip flop 216, which will set the flip flop and provide a high or true signal on its output 217 to AND gate 218. Now assuming that the signal on line 110 is high, and since NAND gate 146 output must be high when ASCII A is present on line 210, the next time that a character received signal is generated by the deserializer/serializer 104, AND gate 218 will have all its inputs high and will cause the character A, still present on lines 210, to be loaded into data latch 154. Each subsequent character received and stored in data latch 144 will similarly be transferred into data latch 154 unless carrier is detected causing line 110 to go low, or the character is ASII Delete. Either of these conditions will inhibit transfer as described previously. When the ASCII character *z* is received and loaded into latch 144, however, it is recognized by NAND gate 214 which resets flip flop 216, so that further data transfer from latch 144 to latch 154 is inhibited.

It will be apparent to those skilled in the art that various modifications and changes may be made to the circuitry of the present invention. Various other types of devices may be substituted for the devices as illustrated in the drawings and description. In addition, the various circuitry may be arranged in a number of various ways and functions performed at various places in the circuit. For example it is not necessary to use serializer portion of the deserializer/serializer 24 or 104. The data coming from the central processor may be transmitted directly to the various terminals with the information merely being tapped off the line and deserialized for controlling the multiplexor switching units. Furthermore, deserializer/serializer 198 may be omitted altogether since the information being sent from the terminals to the central processor is not used to control multiplexor switching units. However, this circuitry has been shown as a preferred embodiment since it does provide a substantial reduction in the distortion levels in the data information being transferred or relayed.

If desired, characters received from the terminals can be used to control the mode of operation of the terminal selector. For example, the character Z received from a terminal and detected at the parallel outputs from deserializer/serializer 198 (FIG. 3) could serve as an alternate to or a replacement for the character Z received from the central processor (FIG. 7).

In view of the above, the present invention may be embodied in other specific forms without departing from the spirit or essential attirbutes thereof and, accordingly, reference should be made to the appended claims, rather than to the foregoing specification as indicating the scope of the invention.

I claim:

1. A process for controlling communication between a central processor and a plurality of terminals, comprising the steps of:

receiving terminal address information in the form of a series of terminal addresses from said central processor;

sending the terminal address information to said plurality of terminals simultaneously; and making a connection with only the last previously addressed terminal in response to the terminal address information to enable the transmission of data only from said last previously addressed terminal to the central processor.

2. A process in accordance with claim 1 including the step of aborting the further sending of terminal address information in response to said last previously addressed terminal being ready to transmit.

3. A process in accordance with claim 1 including the step of limiting the period during which a terminal may transmit to said central processor.

4. A process in accordance with claim 1 wherein said step of receiving terminal address information from said central processor includes the step of demodulating a frequency shift keying signal transmitted over a telephone line.

5. A process in accordance with claim 1 wherein said step of sending the terminal address information to said plurality of terminals simultaneously includes the step of applying the terminal address information simultaneously to each of a plurality of lines, each of said lines being connected to at least one of said plurality of terminals.

6. A process in accordance with claim 1 wherein said step of making a connection includes the steps of decoding terminal address information and selectively switching a line connected to the last previously addressed terminal to a means for sending information back to the central processor to enable the transmission of information from only the last previously addressed terminal to the central processor.

7. Apparatus for controlling communication between a central processor and a plurality of terminals comprising:

means for receiving terminal address information in the form of a series of terminal addresses from said central processor;

means for sending said terminal adress information to said plurality of terminals simultaneously; and means responsive to said terminal address information for making a connection with only the last previously addressed terminal to enable the transmission of data only from said last previously addressed terminal to the central processor.

8. Apparatus in accordance with claim 7 wherein said connecting means includes means responsive to said last previously addressed terminal being ready to transmit for aborting the further sending of terminal address information.

9. Apparatus in accordance with claim 7 wherein said connecting means includes means for limiting the period that a terminal may transmit to said central processor.

10. Apparatus in accordance with claim 7 wherein said receiving means includes demodulator means for demodulating a frequency shift keying signal transmitted over a telephone line.

11. Apparatus in accordance with claim 7 wherein said sending means includes means for applying the terminal address information simultaneously to each of a plurality of lines, each of said lines connecting one of said plurality of terminals with said sending means.

12. Apparatus in accordance with claim 7 wherein said connecting means includes control means for decoding terminal address information and means for selectively switching a line connected to the last previously addressed terminal to a means for sending information back to the central processor to enable the transmission of information from the last previously addressed terminal to the central processor.

13. Apparatus for controlling communication between a central processor and a plurality of terminals, comprising:

means for receiving information from said central processor;

means for sending information to said central processor;

at least one multiplexor switching means, said multiplexor switching means being provided a code input, a predetermined number of terminal inputs, and an output, each of said terminal inputs being adapted to be connected to at least one terminal, said output of said multiplexor switching means being connected to said sending means;

means for simultaneously applying information received by said receiving means to all of said plurality of terminals; and means responsive to terminal addresses received by said receiving means to apply a signal to the code input of said multiplexor switching means whereby the last previous terminal addressed is connected to said sending means via a selected terminal input and the output of said multiplexor switching means.

14. Apparatus in accordance with claim 13 wherein said receiving means includes a demodulator means for demodulating a frequency shift keying signal received over a telephone line.

15. Apparatus in accordance with claim 13 wherein said sending means includes demodulator means, deserializer means, serializer means and modulator means for demodulating signals from said terminals, reconstituting the signals with a minimum of distortion, and frequency shift modulating the signals for transmission over telephone lines.

16. Apparatus in accordance with claim 13 wherein a plurality of multiplexor switching means is provided and at least one of said multiplexor switching means is provided with circuit means for connecting a predetermined terminal input to the output in the absence of an enable signal on an enable input of the multiplexor switching means.

17. Apparatus in accordance with claim 16 wherein a second apparatus for controlling communications between a central processor and a plurality of terminals is connected to said predetermined terminal input connected to the output in the absence of an enable signal on the enable input.

18. Apparatus in accordance with claim 13 including means for detecting predetermined control characters for enabling and disenabling the addressing of terminals.

19. Apparatus for controlling communication between a central processor and a plurality of terminals, comprising:

means for receiving information from said central processor;

means for sending information to said central processor;

a predetermined number of multiplexor switching means, each of said multiplexor switching means being provided with an enable input, a code input, a predetermined number of terminal inputs, and an output, each of said terminal inputs being adapted to be connected by lines to at least one terminal, said output of each of said multiplexor switching means being connected to said sending means;

means for simultaneously applying information received by said receiving means to all of the lines connecting said predetermined number of multiplexor switching means to said terminals;

means for decoding terminal addresses received by said receiving means to provide an enable signal to the input of one of said predetermined number of multiplexor switching means to select one of said predetermined number of multiplexor switching means; and means to apply a code signal to the code inputs of said multiplexor switching means whereby the last previous terminal addressed is connected to said sending means via the selected multiplexor switching means via a selected terminal input and the output of said selected multiplexor switching means.

20. Apparatus in accordance with claim 19 wherein said receiving means includes a demodulator means for demodulating a frequency shift keying signal received over a telephone line.

21. Apparatus in accordance with claim 19, wherein said sending means includes demodulator means, deserializer means, serializer means and modulator means for demodulating signals from said terminals, reconstituting the signals with a minimum of distortion, and frequency shift modulating the signals for transmission over telephone lines.

22. Apparatus in accordance with claim 19 wherein at least one of said multiplexor switching means is provided with circuit means for connecting a predetermined terminal input to the output in the absence of an enable signal on the enable input of the said at least one multiplexor switching means.

23. Apparatus in accordance with claim 22 wherein a second apparatus for controlling communications between a central processor and a plurality of terminals is connected to said predetermined terminal input connected to the output in the absence of an enable signal on the enable input.

24. Apparatus in accordance with claim 19 including means for detecting predetermined control characters for enabling and disabling the addressing of terminals.

* * * * *